United States Patent Office 3,083,841
Patented Apr. 2, 1963

3,083,841
AUTOMATIC LATHE
Guillaume-Ernest Megel, 54 Rue Industrielle, and Henri Mancia, 121 Rue Industrielle, both of Moutier, Switzerland
Filed July 23, 1959, Ser. No. 829,149
Claims priority, application Switzerland July 26, 1958
5 Claims. (Cl. 214—1.2)

This invention relates to automatic lathes and in particular to such lathes which comprise a head stock arranged not only for driving a stock bar in rotation but also for feeding said stock bar step by step to the tools of the lathe to machine identical work pieces at the foremost end of said stock bar, said tools being located in front of said head stock. The invention relates even more particularly to automatic lathes provided, behind their head stocks, with feeding means comprising guiding means to hold the stock bar portion extending behind the head stock, and pushing means with a member mounted for shifting motion relative to said guiding means, said shiftable member always bearing against the rear end of the stock bars in order to prevent the bars from any backward motion when the head stock has come in its foremost position and leaves the stock bar and moves backward to catch it again and to feed it a further step forward during working a new piece at its foremost end. The invention relates still more particularly to lathes in which a driving mechanism acts on the shiftable member of said pushing means to pull said member from its foremost position toward its rearmost position, at the moment at which this member arrives in its foremost position.

In the automatic lathes of this type which are known in the art, the stock bars have to be introduced manually in the feeding and guiding means of the lathe. Now, with long work pieces which do not require time wasting machining operations a stock bar is machined throughout in a relatively short time period and the lathe cannot work very long in a completely automatic manner.

Feeding devices which are at least partly or even wholly automatic are, however, already known in the art, but all these automatic feeding devices are exclusively applied to lathes with an axially fixed head stock. When a stock bar has been completely machined on a lathe with an axially fixed head stock, the automatic feeding devices known in the art pull the shiftable member of the pushing means from its foremost position toward its rearmost position and they introduce then a new stock bar in the guiding means situated behind the lathe and they let finally said shiftable member moving forward again thus feeding the new stock bar to the head stock where this new bar pushes the remaining portion of the old bar forward through the chuck of the head stock.

Till now, none of the automatic feeding devices known in the art could be adapted to an automatic lathe with an axially movable head stock of the type indicated above.

The automatic lathes with an axially movable head stock differ from the lathes with an axially fixed head stock in that the movable head stock is located farther away from the tools than the fixed head stock. In the lathes with a fixed head stock, the tools work indeed directly before the chuck of the head stock on a portion of the stock bar which is thus held very well by said chuck and which is short enough to remain quite straight under the action of the tools.

Although the head stock of the lathes with an axially movable head stock can occasionally be advanced so that its chuck is near the tools, it generally feeds the foremost portion of the stock bars to a fixed or rotary sleeve located between the head stock and the tools, this sleeve being arranged for holding the foremost portion of the stock bar quite straight during the operation of the tools. In other words said sleeve has, in the lathes with a movable head stock, the same function as the chuck of the head stock in lathes with fixed head stock, with regard to holding the stock bars during the operation of the tools.

In the lathes with an axially movable head stock, it consequently always remains a relatively long stock bar portion which cannot be machined furthermore, said remaining stock bar portion having its rear end still engaged in the chuck of the head stock and its front end extending in the working field of the tools. This implies thus that said remaining stock bar portion has a length which is at least equal to the sum of the following lengths: length of the chuck of the head stock; distance between said chuck and said sleeve, said distance being in any case longer than the axial travelling path of the head stock, and length of the sleeve itself.

Now, this long remaining stock bar portion cannot be passed both through the chuck of the head stock and through the sleeve by a new stock bar principally because the automatic lathes with a movable head stock of the type indicated above are generally provided with an auxiliary apparatus mounted on the framework of the lathe in front of the head stock thereof, said apparatus carrying tools such as drills, screw-taps, dies, etc. successively coming in the axis of the head stock and of the sleeve to carry out machining operations on the work piece at the end of the stock bar. Said auxiliary apparatus is indeed located at such a distance of said sleeve, that there is no place between the latter and the tools of the auxiliary apparatus to enable eliminating the unserviceable remaining stock bar portion from the chuck of the head stock and from the sleeve by pushing said stock bar portion forward.

Moreover, the automatic lathes with a movable head stock of the type indicated above are often arranged so that the tool, which cuts the work pieces machined on the front portion of the stock bars, remains fully engaged in working position as long as the chuck of the head stock is open, i.e., when the head stock moves backward to catch the stock bar again and to move it forward a further step for machining a new work piece thereon. Said cutting tool thus serves as abutting means for the stock bar as long as the chuck of the head stock remains open. The stock bar is indeed maintained on contact with said cutting tool by said shiftable member of said pushing means. Now, should the new stock bar push the remaining portion of the old stock bar forward through the chuck of the head stock, it would no longer be possible to use said cutting tool as abutting means for the stock bar, when the chuck of the head stock is open.

Eventually, with stock bars having a relatively small diameter, the new stock bar cannot possibly push the remaining unserviceable portion of the old bar forward through both the chuck of the head stock and the sleeve, even if no apparatus is mounted immediately before the sleeve and even if said cutting tool is not used as abutting means for the stock bar during the opening of the chuck of the head stock. In the free space comprised between the chuck and the sleeve the front end face of the new stock bar would actually not remain in contact with the rear end face of the remaining portion of the old bar. Either one of said stock bars would collapse or be bent otherwise outward the axis of the head stock and the new stock bar would pass on the side of the old stock bar, without pushing the latter forward through the sleeve of the lathe.

It is now an object of this invention to provide a lathe of the type indicated above with an automatic feeding device arranged so that it may actually work in a completely automatic manner.

Another object of this invention is to remove both from the head stock and from the sleeve the remaining stock bar portions which have made possible till now the application to the automatic lathes with an axially movable head stock of an automatic feeding device similar to those which are known in the lathes with an axially fixed head stock.

Still another object of the invention consists in providing the shiftable member of the bar pushing means of the lathe so that said member removes the remaining stock bar portion from the head stock when this member moves backward under the action of the driving mechanism.

Still further objects of the invention will become apparent in the course of the following description.

Two embodiments of the automatic lathe according to the invention are represented diagrammatically and by way of example in the drawings annexed to this specification.

Figure 1:
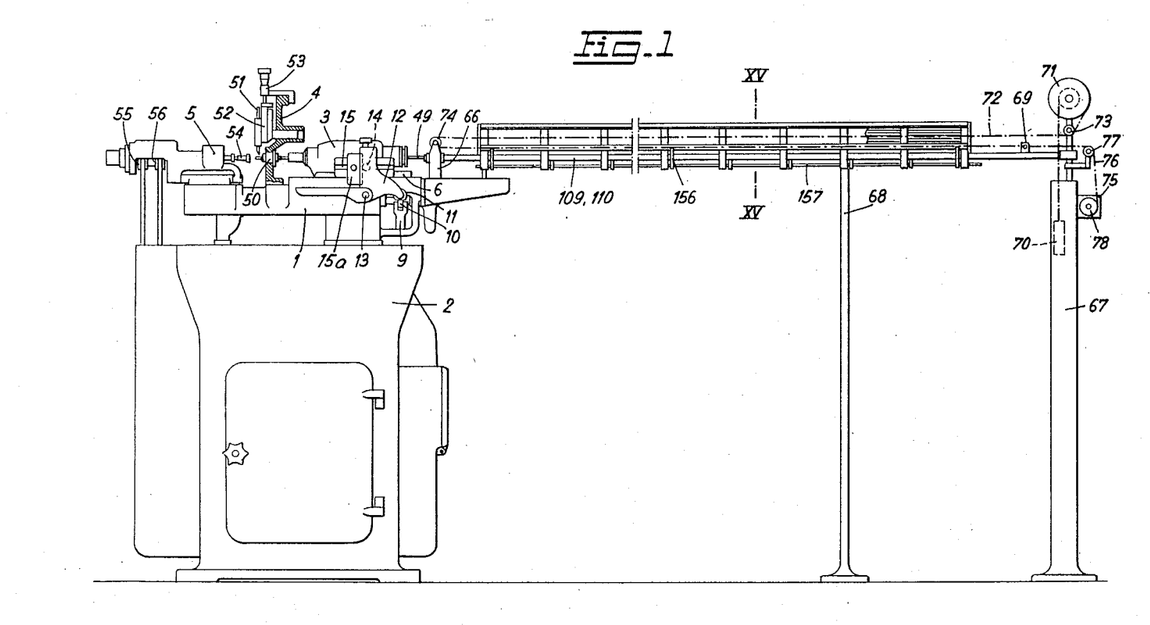
FIG. 1 is a general elevational view of the lathe and of its feeding device.

The automatic lathe shown in FIG. 1 comprises a framework 1 mounted on a stand 2. The framework 1 carries a head stock 3, a support 4 and an auxiliary apparatus 5.

Figure 2:
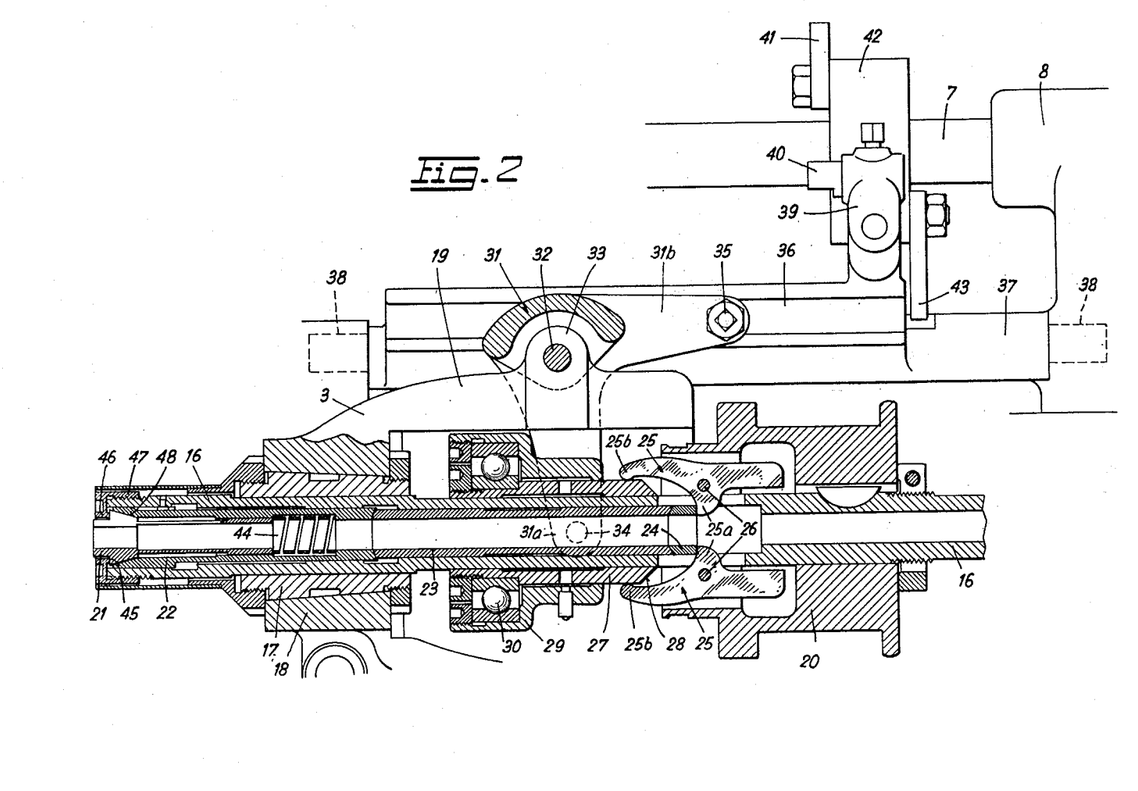
FIG. 2 is a partial plane view partly in section along the axis of the head stock and on a greater scale of some portion of the lathe of FIG. 1.

The head stock 3 an axial section of which along a horizontal plane is shown in FIG. 2 on a larger scale, is mounted on a longitudinal slide 6 of the frame-work 1 of the lathe, so that said head stock can move axially with respect to the frame-work 1. The axial movements of the head stock 3 are controlled by means of a cam fixed onto a camshaft 7 journalled in bearings which are carried in such a manner by frame portions 8 formed on the back side of the frame-work 1 in FIG. 1, that the camshaft 7 extends along the frame-work 1 in parallel with the axis of the head stock 3. The cam fixed onto the camshaft 7 causes a lever 9 pivoted in bearings which are carried by support means integral with the frame-work 1 to effect reciprocate rocking motions about an axis extending in parallel with the axis of the head stock 3. At one of its ends lever 9 carries therefore a follower which bears on the cam fixed onto the camshaft 7. At its other end this lever carries a roller 10 which is in abutting engagement with a roller 11 carried by a horizontal arm of a crank lever 12 pivoting around a transverse axle 13 the bearings of which are fixed with respect to the frame-work 1. The vertical arm of lever 12 carries a finger 14. The distance between this finger 14 and the axle 13 can be set at will by moving said finger along the vertical arm of lever 12. This finger 14 is in abutting engagement with the edge of a plate 15a fixed in an adjustable manner onto a slide 15 integral with the body member of the head stock 3. A strong return spring (not shown) acting on the head stock is permanently holding plate 15a in abutting engagement with finger 14. Said return spring also holds, on the one hand, the rollers 10 and 11 in contact with one another, and, on the other hand, said follower of lever 9 in contact with said cam, so that the finger 14 pushes the head stock 3 forward against the action of said spring when the lever 12 is rocking counterclockwise (FIG. 1) about axle 13 under the action of lever 9, while said finger 14 allows the head stock to slide backward under the action of said return spring when the lever 12 is rocking clockwise.

As shown in FIG. 2, the head stock 3 is provided with a rotatable spindle 16 journalled, on the one hand, in a front sleeve 17 carried by a front portion 18 of the body member 19 of the head stock 3, and, on the other hand, in an analogous rear sleeve carried by a rear portion (not shown) of the body member 19 of said head stock. The spindle 16 is driven in rotation by means of a pulley 20 which is keyed thereonto and it carries a chuck 21 comprising three resilient gripping parts. Closing and opening said chuck are ensured by sleeves 22, 23 and 24 set behind one another within spindle 16, said sleeves being themselves under the action of two pawls 25 pivoting around axles 26 carried by the spindle 16. The pawls 25 are provided each with a nose 25a in contact with the rear face of the sleeve 24, and with a tail portion 25b bearing on a sleeve 27 shiftably mounted on the spindle 16 and provided with a truncated conical end face 28. A second sleeve 29 surrounds the sleeve 27. Whereas the latter rotates together with the spindle 16, the sleeve 29 always remains in the same position around the axis of said spindle. Both sleeves 27 and 29 are, however, connected to one another for axial displacements by means of a ball bearing 30. Although the sleeve 27 is engaged with a frictional fit onto the spindle 16 so as to rotate therewith, it nevertheless can be moved axially with respect thereto. These axial displacements of sleeves 27 and 29 are ensured by a rocker 31 pivoted around a vertical axle 32 engaged in a support 33 integral with the body member 19 of the head stock 3. Besides the two flanges 31a, which pass over sleeve 29 and thereunder, respectively, and which carry pins 34 engaging sleeve 29, the rocker 31 is provided moreover with an arm 31b formed with a spherical portion 35 at its end. This portion 35 engages a groove 36 of a rocker 37 so as to form a hinge therewith. The rocker 37 is formed with pivots 38 journalled in bearings carried by supports integral with the frame-work 1 of the lathe so that said rocker may pivot around an axis extending in parallel with that of the head stock. The rocker 37 is provided moreover with an upper arm 39 carrying a pin 40 which can be actuated by an ear 41 of a cam 42 fixed on to the camshaft 7, and with a lower arm (not shown) also carrying a pin, which can be actuated by an ear 43 of cam 42. A very strong spring 44 is eventually interposed between the chuck 21 and the sleeve 22 to push these two pieces away from one another and to permit of opening the check 21. In the position represented in FIG. 2 the spring 44 holds a front shoulder 45 of the chuck 21 in abutting contact with an inner rim 46 of an end piece 47 screwed onto the front end of the spindle 16. This spring 44 is held in bent or compressed condition by the pawls 25 which hold the sleeves 24, 23 and 22 in such an advanced position that the inward truncated conical end face 48 of the sleeve 22 bears against a corresponding surface of the chuck 21 and closes the latter on the stock bar 49 (FIG. 1). The chuck 21 gets open when the ear 41 of the cam 42 engages the pin 40 of the upper arm 39 of the rocker 37 and causes the latter to rock in such a manner that its groove 36 moves toward the head stock axis. This movement of rocker 37 causes the rocker 31 to rock clockwise in FIG. 2 about its axle 32 and the pins 34 carried by flanges 31a of rocker 31 to move the sleeves 29 and 27 forward thus enabling the tail portions 25b of pawls 25 to move toward the axis of spindle 16. When the sleeve 27 is moving forward, the tail portions 25b actually fall on the spindle 16 under the action of spring 44, which pushes the sleeves 22, 23 and 24 against the noses 25a of pawls 25. This rocking motion of the pawls 25 thus enables the spring 44 to separate the truncated conical surface 48 of sleeve 22 from the corresponding surface of chuck 21. The latter gets closed again at the moment at which the ear 43 of cam 42 engages the pin of the lower arm (not shown) of rocker 37 and moves the latter in such a manner that its groove 36 comes back in the position represented in FIG. 2. This rocking motion of rocker 37 causes the rocker 31 to rock correspondingly about its axle 32 and the sleeves 27 and 29 to come back in their original position. During this last motion the truncated end face 28 of sleeve 27 passes under the tail portions 25b of pawls 25 and causes the latter to rock back into their original positions. This motion of pawls 25 also urges the sleeves 24, 23 and 22 into their original positions toward the front end of spindle 16, the truncated conical surface 48 of the foremost sleeve thereby engaging again the corresponding surface of chuck 21. The means controlling opening and closing the chuck 21 remain in the two corresponding positions described above by friction and more particularly by the friction of sleeve 27 on spindle 16. This friction is still increased in closed position of the chuck 21 by the pawls 25, the tail portions 25b of which strongly bear on the sleeve 27 under the action of spring 44 which has a rectangular cross-section.

The ears 41 and 43 of cam 42 are located with respect to the cam which actuates the lever 9 at such places around the camshaft 7, that ear 41 causes the chuck 21 to get open at the moment at which the cam controlling the lever 9 is going to permit the head stock 3 of moving backward under the action of its return spring, and that ear 43 causes the chuck 21 to get closed at the moment at which the head stock 3 has come in its rearmost position under the action of said return spring.

The front end portion of the stock bar 49, which is driven in rotation by chuck 21 together with spindle 16, is engaged in a sleeve 50, carried by the support 4 (FIG. 1). This sleeve 50, which can be either fixed or mounted for rotary movements of an inner part engaging the feed bar, serves to hold firmly the foremost end portion of bar 49, during the operation of the tools of the lathe. These tools comprise chisels 51 mounted on blocks 52 which can move radially with respect to the axis of the lathe. Slides are provided therefore on support 4. These chisels 51 are arranged fan-wise on this support 4 and they are urged against the work piece machined at the end of the stock bar 49, by means of rockers 53 under the action of cams (not shown) fixed onto the camshaft 7. These chisels 51 are arranged so as to come successively in operative engagement with the lateral faces of said work piece.

One of said chisels has to separate said work pieces from said stock bar 49 as soon as the machining operations of these work pieces are terminated. The cam controlling this cutting chisel is cut in such a manner that said tool remains fully engaged in working position after it has cut the machined work piece, while the chuck 21 gets open under the action of ear 41 and while the head stock moves then backward under the action of its return spring, until the chuck 21 gets closed again under the action of ear 43 of cam 42.

Figure 4:
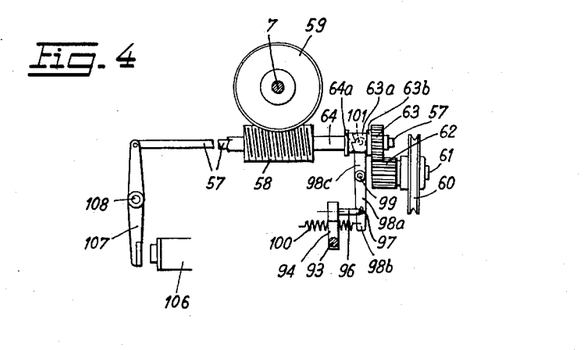
FIG. 4 is a diagrammatic end view of some members of FIG. 3 from the left thereof.

Besides the tools 51, the lathe represented in FIG. 1 also comprises tools carried by the auxiliary apparatus 5. These tools are arranged for working in the axis of the head stock from the front face of the work pieces machined at the end of stock bar 49. In addition to the die stock 54, one or several drills can also be mounted on the apparatus 5 in order to provide axial bore in the work pieces. One or more screw-taps can also be mounted on apparatus 5 in order to cut screw threads in either one of said bores. This apparatus 5 can eventually also carry other die stocks than that which is represented in order to cut threads on several surfaces of different diameters of the outer face of the work pieces. The auxiliary apparatus 5 is arranged so as to lead successively every tool thereof in the axis of the head stock 3. For this purpose it may be provided either with a rocker or a revolver drum controlled by a cam set onto shaft 7. The tool of apparatus 5 which has been led in the axis of the head stock 3 is then pushed toward the latter into working position by a cylindrical cam set onto shaft 7 and by a rocker (not shown). To enable this axial motion of the tools of apparatus 5 with respect to the rocker or to the revolver drum thereof, the said tools are mounted in spindles which are movable axially and rotatably within said rocker or said revolver drum. These spindles are driven in rotation by the pulleys 55 and 56, which are connected by belts to a driving pulley located in the stand 2 of the lathe. This stand 2 also serves to locate the main motor of the lathe, which drives, on the one hand, the pulley 20 of the head stock 3, and, on the other hand, the cam shaft 7 by means of a pulley 60 (FIG. 4) mounted for rotary motion on a trunnion 61 situated on the back side of the frame-work 1 of the lathe. This pulley 60 is made integral with a pinion 62 meshing with a pinion 63 carrying a sleeve 63a and mounted idly on a portion of a transverse shaft 57, which projects from the rear side of the frame-work 1 of the lathe. The pinion 63 drives the camshaft 7 by means of a worm 58 and of a worm-screw 59. The worm 58 is fixed onto a hollow shaft 64 extending coaxially with the shaft 57 and carrying a sleeve 64a. Sleeves 63a and 64a constitute the elements of a clutch connecting pinion 63 to the hollow shaft 64. This clutch is normally in operative position so that the rotations of pulley 60 are transmitted to the worm 58 and consequently to the camshaft 7. This clutch can, however, be set out of operation by moving the pinion 63 and its sleeve 63a together with shaft 57 toward the right in FIG. 4.

It follows from the preceding description that all the functions of the lathe, as well as of the head stock thereof, as also of its tools are controlled by the camshaft 7. The rotary speed of this shaft is adjusted so that one revolution exactly corresponds to one complete cycle of operations for machining a whole work piece at the end of stock bar 49. It will be observed that the relatively slow motion of shaft 57 is completely independent from the rotary motion of pulley 20 of head stock 3. The rotation of shaft 7 can for instance be stopped by means of the clutch (63a, 64a) while leaving the spindle 16 of the head stock rotating.

During the normal operation of the lathe the portion of the stock bars 49 which extends on the rear side of the head stock 3 is held by a guiding device aligned with the frame-work 1 of the lathe and located behind the head stock 3 thereof. This guiding device which is described in detail hereinafter, has its foremost end fixed to a support 66 (FIG. 1) secured to the frame-work 1 of the lathe and its rearmost end carried by a pillar 67. Intermediate pillars 68 help holding the guiding device in order to avoid any flexion thereof between its ends. This guiding device comprises a pusher constituted by a rod 65 and a plate 69 (FIG. 12) made integral with said rod. The rod 65 of said pusher bears against the rear end of the stock bar 49 under the action of a counterweight 70 (FIG. 1) which acts on a rotary drum 71 mounted on pillar 67 at the top thereof. A thread 72, wound up around said drum and passing over pulleys 73 and 74 mounted on the pillar 67 and on the support 66, respectively, has its end attached to the plate 69 of said pusher. The counterweight 70 must be chosen great enough in order to exert on the pusher (65, 69) a pull sufficient to hold the stock bar 49 in contact with the cutting tool, when the head stock moves backward after one piece has been worked out of said stock bar and is going to catch the latter again in order to work a new piece at the end of said bar. The counterweight 70 should however not exert too great a pressure against the rear end of the stock bar 49, because this bar could collapse under such a strong axial pressure.

It follows from the preceding description that the stock bar 49 moves forward step by step together with the pusher (65, 69) bearing against the rear end of said bar at every complete operation cycle of the lathe, every step corresponding to one forward motion of the head stock 3 from its rearmost position to its foremost position, since said pusher actually remains immobile every time the head stock moves back. It occurs thus once that the front end of rod 65 comes near the head stock 3. If the spindle of the latter has a central opening of sufficient diameter, the rod 65 can still enter this spindle 16 and push the stock bar 49 further until the front end of rod 65 arrives behind the chuck 21. At that moment the pusher (65, 69) has reached its foremost position. It would of course make no sense to let the rod 65 enter the chuck 21, since said chuck would then no longer hold the stock bar and the latter would consequently no more be driven in rotation.

When the pusher (65, 69) comes near its foremost position it actuates control elements described hereinafter, which start an auxiliary motor 75. A thread 76, attached to the plate 69 of the pusher and passing over a pulley 77 carried by an arm fixed to the pillar 67, is wound up around a drum 78 fixed onto the rotor of the motor 75. The direction of rotation of this motor is chosen so that it pulls the pusher (65, 69) by means of thread 76, from its foremost position to a rearmost position in which said pusher actuates control elements described hereinafter and which stop the auxiliary motor 75 thus leaving the pusher to the exclusive action of the counterweight 70.

Figure 3:
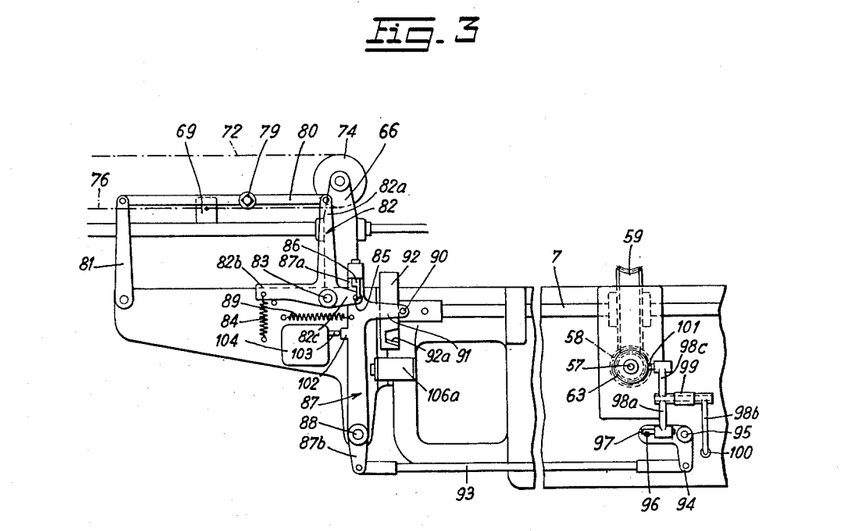
FIG. 3 is a part elevational view on a larger scale of other members of the lathe of FIG. 1 from the rear portion therefrom.

When the pusher (65, 69) is moving forward toward its foremost position, the plate 69 thereof comes once in the position represented in FIG. 3, in which it is going to engage a transverse rod 79 carried by a longitudinal bar 80. This bar 80 is jointed at both ends, on the one hand, to a link 81, and, on the other hand, at the end of an arm 82a of a lever 82 mounted for rocking motion on a trunnion 83 fixed to the frame-work 1. When the plate 69 drives the rod 79 toward the right in FIG. 3 during the forward motion of the pusher, the rod 80 rocks the lever 82 clockwise against the action of a return spring 84 acting on the end of an arm 82b of lever 82. The latter is eventually provided with an arm 82c carrying a stop pin 85. In the position represented in FIG. 3 the stop pin 85 holds a corresponding stop pin 86 fixed to the arm 87a of a lever 87 mounted for rocking motion on a trunnion 88 fixed to the frame-work 1. When the lever 82 rocks clockwise under the action of plate 69 driving rod 79, the stop pin 85 removed from engagement with pin 86, so that the lever 87 can rock counter-clockwise under the action of its spring 89.

Upon disengagement of pins 85 and 86, the lever 87 rocks, however, first only through a very small angle until a pin 90 fixed to a projection 91 of arm 87a thereof falls on a cam 92 set onto shaft 7 at the rear end thereof. The lever 87 only rocks furthermore in a counter-clockwise direction under the action of spring 89 when its pin 90 falls into a notch 92a of cam 92. The latter is arranged in such a manner around shaft 7 that pin 90 enters the notch 92a at the exact moment at which the chuck 21 gets open at the end of an operation cycle of the lathe.

This rocking motion of lever 87 moves a pushing rod 93 toward the right in FIG. 3. This pushing rod 93 is jointed at both ends, on the one hand, to the end of an arm 87b of lever 87, and, on the other hand, to a crank lever 94 mounted for rocking motion on a trunnion 95 fixed to the frame-work 1 of the lathe. This crank lever 94 carries a stop pin 96 engaging a corresponding stop pin 97 fixed to an arm 98a of a three-armed unclutching lever 98, mounted for rocking motion in a support 99 integral with the frame-work 1 of the lathe. A return spring 100 is attached to the arm 98b of lever 98 in order to maintain pin 97 in abutting engagement with pin 96. This lever 98 eventually carries a finger 101 at the end of its arm 98c, said finger engaging a shoulder 63b of pinion 63. When stop pin 96 leaves pin 97, the lever 98 rocks under the action of spring 100 and its finger 101 moves pinion 63 together with its sleeve 63a away from sleeve 64a of the hollow shaft 64, thus unclutching the camshaft 7 from the pulley 60. Stop pins 96 and 97 engage one another in such a manner that former does not release the later when the stop pin 85 of lever 82 releases pin 86 of lever 87, but only when finger 90 of lever 87 falls into the notch 92a of cam 92. In other words, the camshaft 7 is not disconnected from its drive when the plate 69 of the pusher starts driving the transverse rod 79; it is only disconnected therefrom at the end of the operation cycle of the lathe, which has already begun before plate 69 comes in contact with rod 79. It is also only at the end of said operation cycle that a nose 102 of arm 87a of lever 87 actuates the control element 103 of an impulse switch 104 connected in a control circuit described hereinafter, which starts the motor 75. The latter thus starts only when the chuck 21 of head stock 3 gets open at the end of an operation cycle of the lathe.

The motor 75 runs until plate 69 comes in a rearmost position, in which it actuates the movable element of a switch 105 (FIGS. 5, 6, 8, 9 and 11), which starts control operations described hereinafter. Among other effects these control operations have that to excite the magnets 106 and 106a. The armature 107 of the former of these magnets is constituted by a lever mounted for rocking motion on a trunnion 108 fixed to the frame-work 1 of the lathe. This armature is jointed to the transverse shaft 57. When the magnet 106 is excited, it attracts its armature 107 and urges the pinion 63 together with its sleeve 63a into operative engagement with the sleeve 64a of the hollow shaft 64 thus reconnecting the camshaft 7 to its drive. The action of magnet 106 on the armature 107 overbalances, of course, the action of spring 100 on the unclutching lever 98. The latter is consequently urged back in the position represented in FIGS. 3 and 4. Since the magnet 106a is excited at the same time as the magnet 106, the armature of magnet 106a, constituted by lever 87, is attracted at the same time as armature 107. As for the latter, the attraction of magnet 106a overbalances the resistance of spring 89. In other words, the lever 87 comes back to the position of FIG. 3 at the same time as lever 98. The latter is thus caught again in clutching position by means of stop pins 96 and 97. Moreover, when coming back to its original position, the stop pin 86 passes beyond the stop pin 85 which is in the position represented at FIG. 3. The lever 82, the bar 80 and the link 81 are, of course, urged back into the position of FIG. 3 by the spring 84 as soon as the plate 69 of the pusher leaves the transverse bar 79 under the action of the auxiliary motor 75.

FIGS. 5 to 10 inclusive show some details of the guiding device of the stock bars, which is located behind the head stock 3 of the lathe. This guiding device comprises an inner tube 109 and an outer tube 110 mounted on tube 109 for rotation therearound and normally held by spring means (not shown) in the position represented at FIG. 5.

Figures 5, 7:
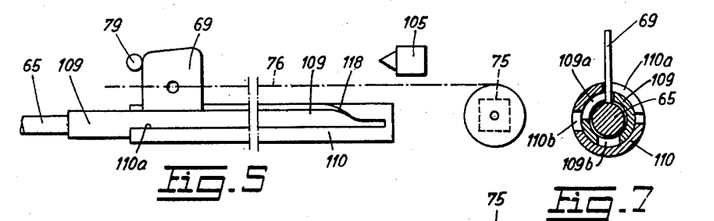
FIG. 5 is an elevational view on a greater scale of some members of the feeding device of the lathe of FIG. 1.
FIG. 7 is a transverse cross-section of the members represented in FIGS. 5 and 6.
Figures 12, 13, 14:
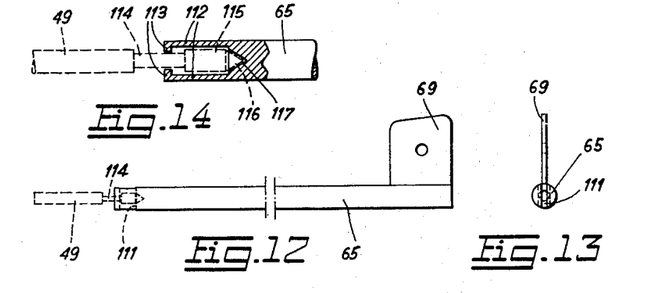
FIG. 12 is an elevational view on a larger scale of a detail of the first embodiment.
FIG. 13 is an end view of the member of the lathe represented in FIG. 12.
FIG. 14 shows a portion of FIG. 12 partly in section and on still a larger scale.

The pusher (65, 69) of the first embodiment of the lathe is represented in detail and on a greater scale in FIGS. 12 to 14 inclusive. The rod 65 of this pusher is located in the inner tube 109. As regards the plate 69 of this pusher, it extends through longitudinal slots 109a and 110a of tubes 109 and 110, respectively. FIG. 7 shows that these longitudinal slots 109a and 110a are provided in the upper part of tubes 109 and 110. In the normal working position the tube 110 closes slot 109a of tube 109.

A vertical passage 111 is provided at the front end of the rod 65 of said pusher, in order to form a pair of yieldable arms 112 at the front end of rod 65 (FIG. 14), said arms 112 being provided with inner projections 113. The rear end of the stock bar 49 is provided for its part with a groove 114 and with a portion 115 having a diameter smaller than that of the stock bar, the portion 115 being located in such a manner between arms 112 of the pusher rod 65 that the projections 113 of arms 112 enter the groove 114. The rear end of rod 49 is finally machined so as to be formed with a conical end point 116 located in a corresponding lodging 117 of rod 65, which serves as bearing to the bar 49, since the latter is driven in rotation by the head stock 3 of the lathe, while the pusher rod 65 is at rest. The arms 112 and their inner projections are arranged in such a manner that they move away from one another when the pusher approaches the rear end of bar 49, the inner projections 113 thus sliding first along the conical surface of point 116 and then along the cylindrical surface of portion 115 before entering the groove 114. Arms 112 and in particular their projections 113 are arranged moreover so as to pull bar 49 toward the right when the pusher is pulled itself in that direction.

Figure 6:
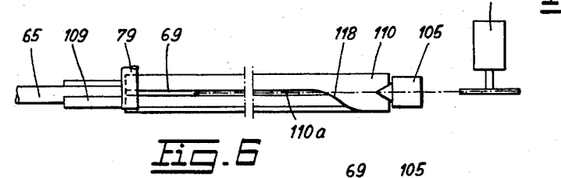
FIG. 6 is a plane view of the members of FIG. 5.

FIGS. 5 to 7 show the pusher at the moment at which its plate 69 engages the transverse rod 79, i.e. at the moment at which no further work piece can be machined on the remaining portion of stock bar 49, so that the latter must be removed from the head stock 3 and from the sleeve 50 of the lathe to permit of introducing a new stock bar therein.

Figure 8:
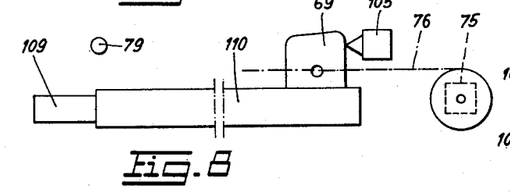
FIGS. 8, 9 and 10 are views analogous to FIGS. 5, 6, 7, respectively, of said members of the feeding device, these members being however in another working position.
Figure 9:
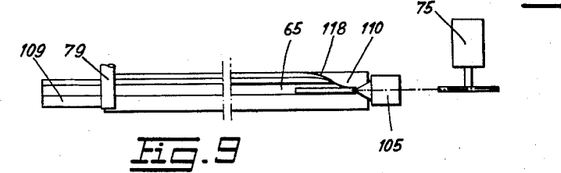
Figure 10:
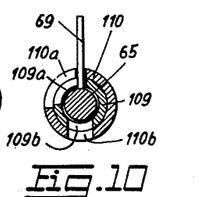

As described hereabove, the forward motion of rod 79 under the action of the pusher plate 69 causes eventually the motor 75 to start and to pull the pusher (65, 69) together with the remaining stock bar portion toward the right in FIGS. 5 and 6 until said pusher comes in the position shown in FIGS. 8 and 9 where its plate 69 actuates the switch 105. The outer tube 110 is provided at the rear end of its longitudinal slot 110a with a cam surface 118 which is oriented in such a manner that the pusher plate 69 rotates the tube 110 around tube 109 from the position of FIG. 7 to that of FIG. 10, when this pusher plate 69 approaches its rearmost position represented in FIGS. 8 and 9. The FIGS. 7 and 10 show that said rotation of the outer tube 110 leads the longitudinal slots 109a and 110a of tubes 109 and 110 into coinciding position. A new stock bar can thus be introduced into the inner tube 109 through the opening formed by slots 109a and 110a. The rear portions of tubes 109 and 110 are provided moreover with slots 109b and 110b, the slot 109b being normally closed by tube 110 as shown in FIG. 7. When the pusher plate 69 has, however, rotated tube 110 to the position of FIG. 10, both slots 109b and 110b are also coinciding and they form together an opening in the lower portion of the feed bar guiding device composed of both tubes 109 and 110. The position and the length of slots 109b and 110b are chosen in such a manner that the remaining portion of the stock bar 49, which has been pulled back out of the sleeve 50 and of the head stock 3 of the lathe by the pusher (65, 69) under the action of the motor 75, can fall out of tubes 109 and 110, through the opening formed by slots 109b and 110b, when the pusher has come in its rearmost position represented in FIGS. 8 and 9.

Figure 11:
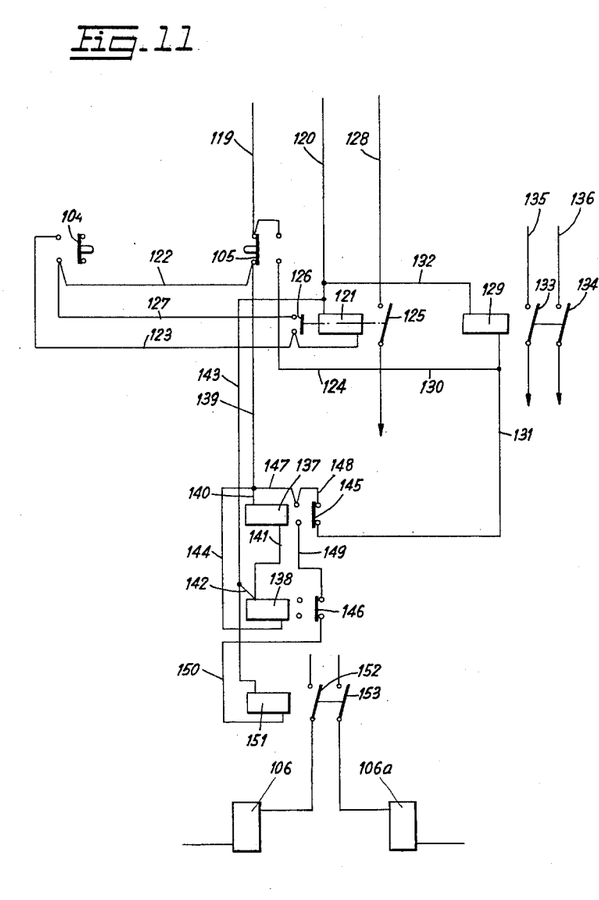
FIG. 11 is a wiring diagram of the control members of the lathe of FIG. 1.

The circuits controlled by switches 104 and 105 are represented in the wiring diagram of FIG. 11. The different components of these circuits are fed from the mains 119 and 120 which can be derived for instance from a couple of phases of the three-phase current feeding the main motor of the lathe, said derivation possibly comprising a rectifier. The movable elements of switches 104 and 105 are represented in the wiring diagram of FIG. 11 in the position in which they are normally, when the lathe is working. As described hereabove, the switch 104 is actuated by the nose 102 of lever 87 at the moment at which the pin 90 of this lever falls into notch 92a of cam 92. The switch 104 is arranged in such a manner that it remains closed only during a very short period. In other words, the action of nose 102 onto element 103 closes the switch 104, but the latter gets open immediately afterward. The impulse thus transmitted into the circuit formed by the main 119, switch 105, lead 122, switch 104, leads 123 and 124, coil of relay 121 and main 120 suffices in order to enable closing both the circuit-breaker 125 and the holding switch 126 under the action of relay 121. When switch 104 has got open after said impulse, the relay 121 is still excited, since the holding switch 126 closes the circuit comprising main 119, switch 105, leads 122 and 127, switch 126, lead 124, coil 121 and main 120. The switch 126 thus holds the circuit-breaker 125 closed. The latter is connected on a lead 128 forming part of the feeding circuit of the motor 75. The impulse given by switch 104 under the action of nose 102 thus suffices to close the circuit-breaker 125, to start the motor 75 and to let the latter run until pusher (65, 69) has been pulled back from its foremost position to its rearmost position in which its plate 69 actuates the movable element of switch 105 and urges said element into its other working position. As soon as the movable element of switch 105 leaves the position represented in the wiring diagram of FIG. 11 under the action of pusher plate 69, the current feeding coil 121 is interrupted and the circuit-breaker 125 as well as the holding switch 126 immediately get open. The motor 75 stops and the pusher (65, 69) is released to the action of counter-weight 70, which urges this pusher (65, 69) forward again toward the head stock 3 of the lathe. As soon as said pusher starts moving forward under the action of counter-weight 70, the movable element of switch 105 comes back again to the position represented in FIG. 11.

During the very short period while the pusher plate 69 actuates the movable element of switch 105, the latter closes the circuit of the coil of a relay 129, said circuit comprising main 119, switch 105 (displaced), leads 130 and 131, coil of relay 129, lead 132 and main 120. The impulse thus transmitted to the relay 129 suffices to close the circuit-breakers 133 and 134 connected on the leads 135 and 136, respectively. The lead 135 forms part of a circuit controlling a braking device acting on drum 71 and the lead 136 forms part of a circuit controlling an automatic feeding device described hereinafter. The relay 129 has a retarded release so that the circuit-breakers 133 and 134 do not get open while the movable element of switch 105 jumps from its displaced position to the position represented at FIG. 11.

The diagram of this FIG. 11 still shows two relays 137 and 138 connected in parallel the coils of which are fed, the first one, by the circuit comprising main 119, switch 105, leads 139 and 140, coil of relay 137, leads 141, 142, 143 and main 120, and the second one, by the circuit comprising main 119, switch 105, leads 139 and 144, coil of relay 138, leads 142, 143 and main 120. Since the movable element of switch 105 is generally in the position represented in FIG. 11, the relays 137 and 138 are generally excited and their armatures, constituted by the movable elements of switches 145 and 146, are attracted.

When the pusher plate 69 actuates the switch 105, the feeding circuit of relays 137 and 138 is interrupted and the movable elements of switches 145 and 146 are released so that they fall in the position represented at FIG.

11. When the pusher plate 69 moves forward again under the action of counter-weight 70, and when the movable element of switch 105 consequently jumps back to the position represented at FIG. 11, the feeding circuits of the coils of relays 137 and 138 are closed again. Said coils, however, do not immediately attract the movable elements of switches 145 and 146. The relays 137 and 138 have indeed retarded attractions during the time periods $t_1$ and $t_2$, respectively, $t_2$ being greater than $t_1$.

Since the movable element of switch 145 still remains, during the time $t_1$, in the position represented in the drawings, the feeding circuit of the coil of relay 129 gets closed again at the moment at which the movable element of switch 105 comes back to the position of FIG. 11, said feeding circuit comprising main 119, switch 105, leads 139, 147, 148, switch 145, lead 131, coil 129, lead 132 and main 120. The feeding circuit of the coil of relay 129 is thus only interrupted during the time required by the movable element of switch 105 to jump from its displaced position to the position represented at FIG. 11. In order that the circuit-breakers 133 and 134 do not get open while the switch 105 jumps from one of its positions to the other one, the relay 129 needs only to have a release retarded during a period longer than that required by the switch 105 to jump from one of its positions to the other one. The feeding circuit of coil 129, will, however, be definitely interrupted after the time $t_1$, when the movable element of switch 145 will be attracted by the coil of relay 137.

At the moment at which the movable element of switch 145 is attracted, the latter closes the circuit of the coil of a relay 151 by means of the following elements: main 119, switch 105, leads 139 and 147, switch 145 (displaced), lead 149, switch 146, lead 150 coil of relay 151, lead 143 and main 120. When the relay 151 is excited, it closes immediately the circuit-breakers 152 and 153 connected in the feeding circuits of the magnets 106 and 106a, respectively. The relay 151 remains excited until the relay 138 opens the switch 146, after the time $t_2$. The relay 151 will thus remain excited during the time $t_2-t_1$, which needs only be sufficient to enable the magnets 106 and 106a reclutching the camshaft 7 and restoring the levers 87 and 94 in the locking position represented in FIG. 3.

Figure 15:
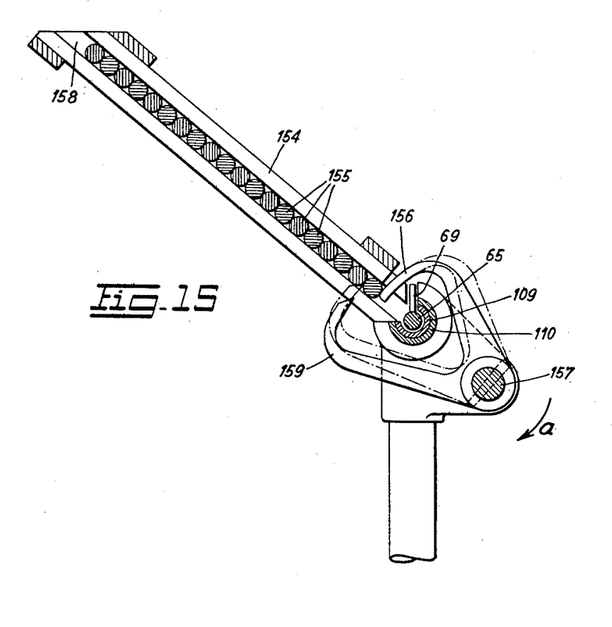
FIG. 15 is a cross-sectional view on a greater scale along line XV—XV of FIG. 1.

The bar feeding device introducing new stock bars into the tube 109 is represented in FIGS. 1 and 15. It comprises an inclined magazine 154 filled with stock bars 155. These bars are held in the magazine 154 by arms 156 carried by a shaft 157 (see also FIG. 1). This shaft 157 carries several arms 156 arranged uniformly in the overall length of magazine 154. At the moment at which a new stock bar must be introduced into tube 109, the shaft 157 is actuated in the direction of arrow $a$ by a magnet (not shown) connected in the circuit 136 of the circuit-breaker 134, said magnet attracting an arm (not shown) fixed to shaft 157 at the moment at which circuit-breaker 134 gets closed.

The shaft 157 rotates under the action of said magnet until the ends of the arm 156 shown in FIG. 15 and of the similar arms represented at FIG. 1 release a bar from the magazine 154. When shaft 157 has rotated to such an extent that its arms 156 are out of the passage 158 of magazine 154, another series of arms 159 has entered said passage 158 as shown in dot-and-dash lines in FIG. 15. The arms 156 and 159 are arranged so as to release only one bar at once from the magazine 154, said bar falling then into tube 109.

The control device comprising the circuits represented at FIG. 11 thus ensures the automatic feeding of the lathe in the following manner:

When the stock bar 49 has been worked out as much as possible, the plate 69 of the pusher acting on said bar engages the transverse rod 79 of bar 80. By moving said rod and said bar forward, the pusher plate 69 thus releases lever 87. Have the tools of the lathe already begun a cycle of machining operations on a work piece at the front end of bar 49, they will then terminate that cycle until the cutting tool separates the work piece from the bar and the head stock chuck 21 gets open. At that exact moment, the cam 92 also releases lever 87 thus disconnecting the camshaft 7 from its drive and starting motor 75. With the camshaft 7 at rest the lathe is completely inoperaive; the cutting tool remains fully engaged in working position and the head stock chuck 21 also remains open. The motor 75, which pulls the pusher (65, 69) backward, can thus also remove the portion of the stock bar 49 remaining both in the sleeve 50 and in the head stock chuck 21 therefrom. The pusher (65, 69) moves thus backward until it has reached its rearmost position with respect to the guiding device. Before coming in this rearmost position, the pusher plate 69, however, engages the cam surface 118 of tube 110 and it rotates said tube until its slots 110a and 110b coincide with the corresponding slots 169a and 169b of the inner tube 109 of the guiding device. When the pusher (65, 69) comes in its rearmost position, the remaining portion of the stock bar 49 falls by its own weight through the slots 109b and 110b (FIG. 10) of the guiding device. The portion 115 of said stock bar, which is engaged between the yieldable arms 112 of the pusher, is not retained thereby, because of the passage 111 which is vertical. At the same time the pusher plate 69 actuates the switch 105 thus breaking the energizing circuit of relay 121 and exciting the relay 129. The release of relay 121 stops the motor 75, whereas the excitation of relay 129 closes the circuit-breakers 133 and 134. The first circuit-breaker renders the braking device of drum 71 operative, whereas the second circuit-breaker causes shaft 157 to rotate in the direction of arrow $a$. The object of said braking device is to prevent the pusher (65, 69) from starting too brusquely its forward motion under the action of the counterweight 70 to which it is leaved. With said braking device the pusher (65, 69) starts moving forward slowly and uniformly. The rotation of shaft 157 causes for its part the lowest bar 155 of magazine 154 to fall into tube 109 through the slots 109a and 110a of the tubes 109 and 110 of the guiding device. During its forward motion, the pusher (65, 69) passes beyond the cam surface 118, thus enabling the spring (not shown), which acts on tube 110, to rotate the latter backward from the position of FIG. 10 to that of FIG. 7. The tube 110 thus closes the slots 109a and 109b of the inner tube 109, while leaving only the pusher plate 69 passing through the parts of slots 109a and 110a which are still coinciding. Said pusher comes then in contact with the rear end of the new stock bar which has fallen into the tube 109 and it pushes said bar forward through both spindle 16 and chuck 21 as well as through the sleeve 50 of the lathe, until the front face of said bar butts against the cutting tool, which is still fully engaged in working position and which thus serves as stop to the new bar. The braking device acting on drum 71 must particularly be adjusted so as to let pusher (65, 69) move forward slowly enough to prevent the new stock bar introduced into tube 109 from breaking the cutting tool when it butts thereagainst. When the new stock bar is butting against the cutting tool, the thrust exerted by counterweight 70 on pusher (65, 69) is sufficient to cause first the inner projections 113 of arms 112 sliding on the conical surface of end point 116 at the rear end of the new stock bar, and then said projections 113 sliding along the cylindrical surface of portion 115 of the new stock bar, until said inner projections enter the groove 114 of said new bar. The time $t_1$ of the retarded attraction of relay 137 is adjusted in such a manner that switch 145 is attracted only when the yieldable pusher arms 112 are gripping the rear portion of the new stock bar. This switch 145 breaks then the energizing circuit of relay 129 and excites relay 151 which closes the circuit-breakers 152 and 153 of the energizing circuits of magnets 106 and 106a. Releasing the relay 129 causes the circuit-breakers 133 and 134 to get open thus rendering firstly the braking device of drum 71 (which is no longer necessary) inoperative, and carrying secondly the shaft 157 together with arms 156 and 159 back to their original position of FIG. 15 by moving them from the dot-and-dash lines position to the position represented in full lines in that FIG. 15. The magnets 106 and 106a cause for their parts the levers 87 and 94 to return in locking position and the camshaft 7 to be connected again to its drive. This shaft 7 moves first the head stock 3 toward its rearmost position (provided that it did not reach said position before the camshaft 7 was unclutched); it closes then the head stock chuck 21 and removes eventually the cutting tool from the forward path of the new stock bar. The head stock 3 drives afterward said new bar into the field of operation of the tools of the lathe, which can thus start their work on the new bar. After the time $t_2$ (longer than $t_1$), the relay 138 attracts switch 146 and breaks the energizing circuit of relay 151.

The control mechanism of the automatic feeding device of the lathe has thus terminated its operation cycle and it is ready to start a new operation cycle, when the new bar will be worked out entirely. To keep the lathe under normal operative condition for producing series of identical pieces, it suffices thus to load a sufficient stock of bars into the magazine 154.

The control device of the automatic feed described hereabove does not stop the head stock rotating while feeding the new bar. This has the advantage that the lubrication oil of the head stock bearings is always maintained at the same temperature. However, should the head stock nevertheless be stopped during the feeding operation, this could be obtained with an additional relay which would open and close a circuit-breaker connected in the feeding circuit of the main motor of the lathe, at the same time as the camshaft 7 is itself unclutched and reclutched.

Instead of controlling the automatic feeding operations of the lathe by means of the electrical device described hereabove, said operations could also be controlled for instance by means either of mechanical, or of hydraulic or even of electronic devices.

Figure 17:
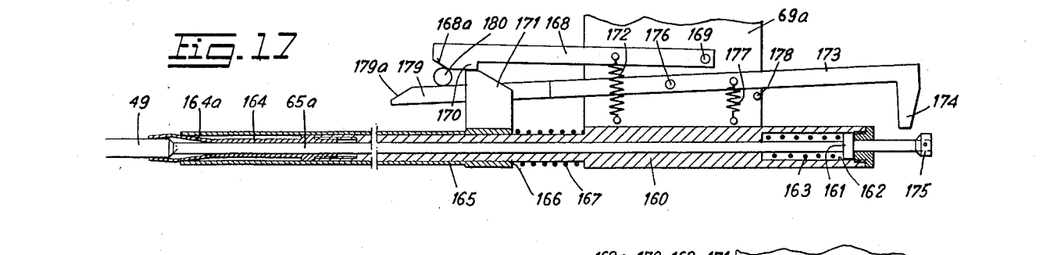
FIGS. 17 and 18 are views analogous to that of FIG. 16, said elements being represented in two other working positions, respectively.
Figure 18:
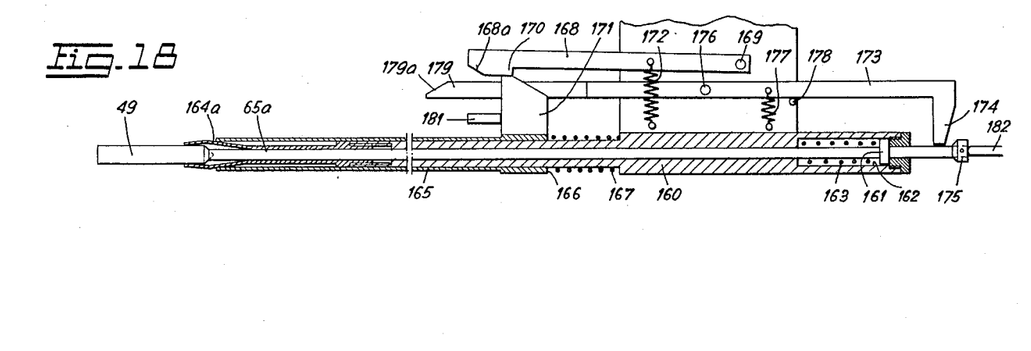

The second embodiment of the lathe (FIGS. 16 to 18) differs from the first embodiment only by the arrangement of the pusher which bears against the rear end of the stock bars and by some control members of this pusher.

Figure 16:
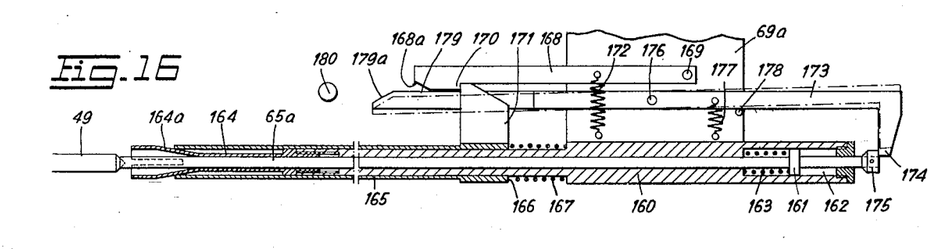
FIG. 16 is an elevational view with some parts in section of some elements of the second embodiment of the lathe.

The pusher of the second embodiment of the lathe also comprises a rod 65a and a plate 69a. These two elements are however not made integral with one another. The plate 69a is made integral with a tubular casing 160 mounted on rod 65a for shifting motion with respect thereto. The axial movements of casing 160 with respect to rod 65a are however limited by an annular rim 161 of rod 65a, which is caught in a lodging 162 of casing 160 formed at the bottom thereof. A coil spring 163 located in lodging 162 urges the rod 65a backward with respect to casing 160. Said casing carries at its front end a chuck 164 a threaded portion of which is screwed into the tapped end of casing 160. A sleeve 165 is mounted on the front portion of the external face of casing 160 in such a manner that it may be shifted axially with respect thereto. A coil spring 167 is bent between a shoulder of casing 160 and the rear face 166 of sleeve 165 to urge the latter forward with respect to said casing. The length of sleeve 165 is chosen in such a manner that its foremost portion engages an enlarged portion 164a of chuck 164 in order to close said chuck, when the sleeve 165 is abandoned to the action of spring 167. Sleeve 165 is however normally held in a rear portion, against the action of spring 167, in order to leave the chuck 164 open, by means of a detent 168 mounted for rocking motion on a trunnion 169 fixed to plate 69a, said detent comprising a nose 170 which catches the plate 171 fixed to sleeve 165.

A spring 172 prevents detent 168 from releasing inopportunely the plate 171.

The rod 65a is similarly held against the action of spring 163 in an advanced position with respect to casing 160 by a lever 173 which has a nose 174 engaged behind a head 175 fixed to the rear end of rod 65a. This lever 173 is also mounted for rocking motion on the pusher plate 69a by means of a trunnion 176. A spring 177 holds the lever 173 in abutting engagement with a pin 178, in the position represented in full lines in FIG. 16. In this position, the nose 174 catches the head 175 of rod 65a so that this rod and the casing 165 forms a single unit. The lever 173 is eventually provided with a tail portion 179, which is longer than detent 168. This tail portion 179 and the detent 168 have both a bevelled front corner as shown at 179a and 168a to engage in a purpose described hereinafter, a cylindrical pin 180 carried by a projection (not shown) of arm 87a of lever 87 (FIG. 3).

The pusher rod 65a represented in FIG. 16 is arranged for bearing against the rear face of the stock bar in the same manner as the usual one-piece pusher rods of the lathes known of the type described. Since the stock bar is driven in rotation with respect to the fixed pusher rod 65a, a conical point is formed at the rear end of said bar and a corresponding conical seat is also formed in the front end of rod 65a, which is normally extending outside the chuck 164.

The pusher according to this second embodiment of the lathe is driven to and fro along tubes 109 and 110 in the same manner as the pusher of the first embodiment, i.e. by means of two threads attached to its plate 69a, said threads being arranged, the first one, to pull said pusher forward with respect to the guiding device, under the action of counterweight 70, and the second one, to pull said pusher rearward with respect to said guiding device, under the action of motor 75. In a similar manner as in the first embodiment, the casing 160 and the sleeve 165 are located in the inner tube 109 of the guiding device, whereas the plates 69a and 171 protrude from the tubes 109 and 110 while passing through the coinciding parts of slots 109a and 110a of said tubes.

The pusher plate 69a of this second embodiment controls the cycle of the feeding operations of the lathe, as the plate 69 of the first embodiment, by actuating the transverse rod 79, when it approaches its foremost position, and the switch 105, when it moves backward toward its rearmost position. The cylindrical pin 180 is fixed onto the projection of arm 87a of lever 87 in such a position that is can be engaged by the bevelled corner 179a of tail portion 179 of lever 173 so as to cause this lever 173 rocking into the position represented in dot-and-dash lines in FIG. 16, when pin 90 of arm 91 of lever 87 falls into notch 92a of cam 92.

At the moment at which lever 173 comes in the position represented in dot-and-dash lines in FIG. 16, its nose 174 releases the head 175 of rod 65a. Since the latter butts against the stock bar 49, the plate 69a, the casing 160 and the sleeve 165 are moving on alone under the action of counterweight 70. During this last motion of plate 69a, the foremost portion of chuck 164 comes over the rear end of stock bar 49. Moreover, the bevelled corner 168a of detent 168 also engages pin 180 which rocks detent 168 in such a manner that its nose 170 releases the plate 171 of sleeve 165. At the moment at which this plate 171 is released, the spring 167 urges the sleeve 165 forward with respect to the casing 160, until it has reached the position represented in FIG. 17. This figure shows that the sleeve 165 closes the chuck 164 on the rear end of stock bar 49. To avoid here that the motor 75 starts before the chuck 164 is closed, since the pusher described must remove the remaining stock bar portion from both the sleeve 50 and the head stock chuck 21 when it moves backward under the action of motor 75, a relay having an attraction somewhat retarded can be used to actuate the circuit-breaker 125 of motor 75, the relay 121 then serving only to close immediately the holding switch 126.

When the motor 75 has pulled the pusher until the latter comes near its rearmost position, said pusher actuates a mechanism (not shown) which rocks an arm 181 (FIG. 18) in a horizontal plane in such a manner that said arm engages the plate 171 of sleeve 165 and moves said sleeve backward until the nose 170 of detent 168 catches and holds the plate 171 under the action of spring 172. This backward motion of sleeve 168 under the action of arm 181 opens the chuck 164. When the pusher described moves on backward under the action of motor 75, the head 175 of its rod 65a butts against a fixed stop 182. This stop 182 retains, however, only the rod 65a. The casing 160 with its plate 69a can still move backward under the action of motor 75. During this last backward motion, the rod 65a, on the one hand, prevents said stock bar portion from remaining in chuck 164, and the nose 174 of lever 173, on the other hand, passes beyond the head 175 of rod 65a.

The pusher described has thus been restored in its original position and it is ready to engage the new stock bar introduced by the automatic feeding device into the guiding device constituted by tubes 109 and 110. Like in the first embodiment, the portion of bar 49 removed from the head stock of the lathe falls through the opening formed by slots 109b and 110b, as soon as it has been ejected from chuck 164 by rod 65a.

The mechanism actuating arm 181 is arranged in such a manner as to remove this arm from the path of the pusher as soon as it has urged the plate 171 behind the nose 170 of detent 168. Finally, the switch 105 is located in such a position that plate 69a does not actuate said switch before nose 174 of lever 173 has passed behind head 175 of rod 65a.

Instead of mounting pin 180 onto lever 87, one could also mount this pin on a support fixed to the framework of the lathe. In this case, said pin should be adjusted in such a manner that it ensures releasing the lever 173 at the moment at which the head stock 3 feeds the stock bar 49 to cut therefrom the last work piece machined at the front end thereof. Moreover, the plates 69a and 171 should be made integral with independent sleeves idly mounted on casing 160 and on closing sleeve 165, respectively, so as to enable casing 160, chuck 164 and sleeve 165 to turn with the stock bar 49 from the moment at which chuck 164 grips the stock bar 49, until the head stock chuck 21 gets open at the end of the operation cycle of the lathe.

Instead of actuating the pushers as described above with reference to the two embodiments represented in the drawings, i.e. forward by means of a counterweight and rearward by means of a motor, they could also be actuated by other means, for instance either by a servo-motor driving an endless chain to which the pusher would then be attached, or by pneumatic or hydraulic means.

Moreover, instead of a guiding device constituted by a pair of coaxial tubes, a revolver drum carrying a plurality of guiding tubes and a pusher in each tube could also be used.

In this case, the said revolver drum could be mounted so as to hold the bar engaged in the head stock of the lathe by means of the tube which is in the upmost position of the revolver drum. The remaining stock bar portions removed from the sleeve carried by support 4 and from the head stock of the lathe by the said pushers could then be eliminated as in the embodiments described above. These stock bar portions could thus pass through an opening provided in the lowest rear portion of said tubes and fall into a central portion of the revolver drum, wherefrom a compressed air jet could then advantageously blow them away.

These remaining stock bar portions could, however, also be eliminated through an enlarged portion of the slots serving as passage to the pusher plates, when said tubes pass in the lowest position of the revolver drum. These tubes could then receive the new bars from a magazine for instance at the moment at which they pass in the position preceding the upmost position of the revolver. The control device represented in FIG. 11 could eventually comprise, in addition to a circuit analogous to that of circuit-breaker 134 to control the introduction of new stock bars into the tubes of the revolver drum, a circuit energizing a magnet arranged so as to drive the revolver drum one step forward every time a bar has been machined completely.

Although two embodiments with variants have been described in detail hereabove, it should be understood that various changes in the shape, sizes and arrangement of parts could be resorted to within the scope of the appended claims without departing from the spirit of the invention or sacrificing the advantages thereof.

We claim:

1. In a feeding device for an automatic lathe, in combination, pushing means axially movable between a rearmost position and a foremost position and having a front end portion formed with an axial conical cavity arranged for bearing against a conical rear end of a stock bar to prevent said stock bar from any backward motion and to center the rear end of the stock bar with respect to said pushing means while permitting free rotation of the stock bar relative to the pushing means; driving means operatively connected to said pushing means for moving the latter from their foremost position toward said rearmost position; gripping means on said pushing means for catching the stock bar pushed by said pushing means and for driving it backward together with said pushing means when said driving means drive said pushing means towards their rearmost position and for releasing said stock bar when said pushing means come near their rearmost position under the action of said driving means, said gripping means having a plurality of arms engaging the stock bar during movement of said pushing means from said foremost to said rearmost position thereof for pulling the stock bar rearwardly and said arms being spaced from the stock bar during reverse movement of said pushing means so as not to impede free rotation of the stock bar relative to the pushing means during movement of the latter from the rearmost to the foremost position thereof; and a guiding device provided in the rear portion thereof with a longitudinal slot to form a passage for eliminating from said guiding device the stock bar portions driven backward by the gripping means of said pushing means under the action of said driving means.

2. A combination according to claim 1, said guiding device comprising a fixed tube provided in its upper portion with a first longitudinal slot of predetermined length to enable a new stock bar to fall into said tube, and provided in the lower part of its rear portion with a second longitudinal slot of predetermined length said second slot being shorter than said first slot and forming said passage for eliminating the stock bar portions removed from said head stock.

3. A combination according to claim 1, said pushing means comprising a rod extending in said guiding device coaxially to a stock bar, said rod fixedly carrying said two arms forming said gripping means and said arms being arranged so as to be laterally spaced from a swelled portion formed at the rear end of the stock bar, and said arms carrying each an inner projection arranged for entering a groove of the stock bar formed in front of said swelled portion while permitting the remnant of the stock bar to fall out of said gripping means when the latter aligns the stock bar remnant with said slot in said guiding device.

4. A combination according to claim 3, said arms being yieldable so as to move away from one another when said inner projections are in contact with a conical point formed at the rear end of the stock bar, behind said swelled portion, and when said pushing means are urged against the stock bar.

5. In a feeding device for an automatic lathe, in combination, pushing means axially movable between a rearmost position and a foremost position and arranged for bearing against the rear end of a stock bar to prevent said stock bar from any backward motion; driving means operatively connected to said pushing means for moving the latter from said foremost position toward said rearmost position; gripping means on said pushing means for catching the stock bar pushed by said pushing means and for driving it backward together with said pushing means when said driving means drives said pushing means toward their rearmost position and for releasing said stock bar when said pushing means come near said rearmost position under the action of said driving means; and a guiding device comprising a fixed tube provided in its upper portion with a first logitudinal slot of predetermined length to enable a new stock bar to fall into said fixed tube, and provided in the lower part of its rear portion with a second longitudinal slot of predetermined length shorter than said first slot and forming a passage for eliminating from said guiding device a stock bar portion driven backward by the gripping means of said pushing means, said guiding device further comprising a second tube coaxial with said first tube and mounted for rotary movement therearound, said second tube being provided with two longitudinal slots similar to said slots of said first tube and arranged so that they coincide therewith when said second tube is in a predetermined position around said first tube, a cam surface on the rear part of said second tube and being engaged by said pushing means for rotating said second tube around said first tube into said predetermined position when said pushing means are moving backward under the action of said driving means.

References Cited in the file of this patent

UNITED STATES PATENTS

| | | |
|---|---|---|
| 1,362,286 | Gerhardt | Dec. 14, 1920 |
| 2,319,963 | Wilson et al. | May 25, 1943 |
| 2,374,112 | Lloyd | Apr. 17, 1945 |
| 2,376,476 | Chatelain | May 22, 1945 |
| 2,595,522 | Harney | May 6, 1952 |
| 2,602,213 | Winchell | July 8, 1952 |
| 2,906,003 | Lakins | Sept. 29, 1959 |